UNITED STATES PATENT OFFICE.

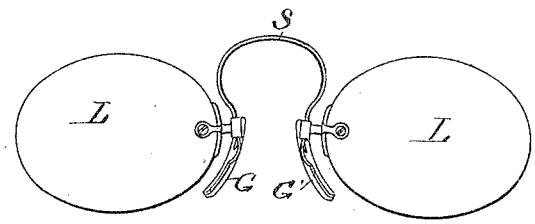
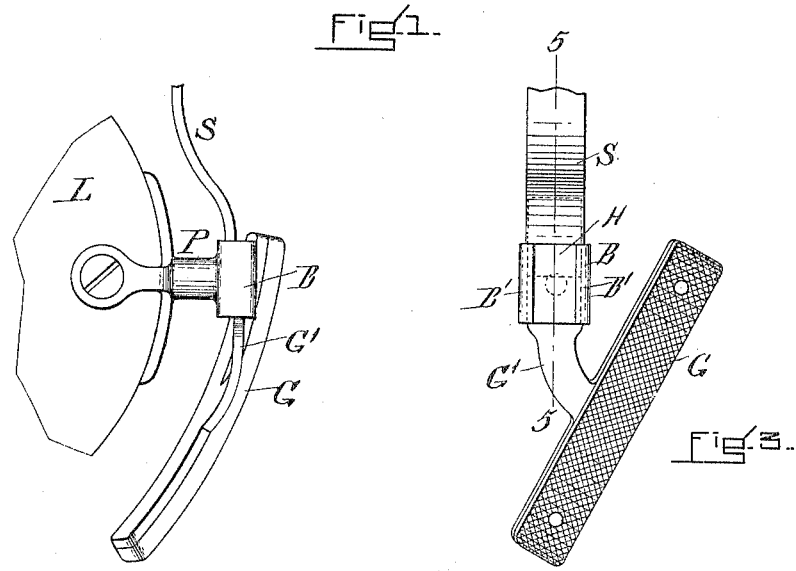
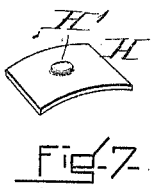

HARRY FENNELL, OF EVERETT, MASSACHUSETTS.

EYEGLASSES.

No. 804,527.     Specification of Letters Patent.     Patented Nov. 14, 1905.

Application filed December 29, 1904. Serial No. 238,790.

*To all whom it may concern:*

Be it known that I, HARRY FENNELL, a citizen of the United States, and a resident of Everett, in the county of Middlesex and State of Massachusetts, have invented a new and useful Improvement in Eyeglasses, of which the following, taken in connection with the accompanying drawings, is a specification.

My invention relates to the manner of attaching the lenses of eyeglasses to the frame or nose-piece; and it consists in a peculiarly-constructed spring-plate for locking the screw that holds the spring and guard to the post, the object being to insure certainty of the screw always remaining in its holding position. This object I attain by the means shown in the accompanying drawings, in which—

Figure 1 shows a pair of eyeglasses in elevation. Fig. 2 is an elevation, enlarged, showing a part of one of the lenses and one of the posts and its connected parts. Fig. 3 is a side view of the parts shown in Fig. 2. Fig. 4 is a plan of the same parts except that the spring is shown in section. Fig. 5 is a section on line 5 5 of Fig. 3. Figs. 6 and 7 show the spring-plate that locks the screw in place.

In the drawings the lenses are represented by L and the connecting-spring by S. The lenses are attached to the posts P in the usual manner.

The post P has at its end a part B, which is usually termed the "box." This box is open at each end, as shown in Figs. 3 and 5, and is constructed to receive the end of the spring S and also the arm G' of the guard G and a holding-piece H, as shown in Figs. 4 and 5. The longitudinal sides of the box B are constructed with overhanging lips B' B', which serve to retain and hold the spring-plate H (see Figs. 6 and 7) when it is in its locking position. The holder H is made from a sheet of spring metal and is shaped as shown in Figs. 6 and 7, it being curved and made with a depression, as shown at H', curved so that when in position it presses on the head of the screw T, the head of the screw resting in the depression H', thus preventing the plate from slipping out. The screw T passes through the spring S and the arm G' of the guard G, and thus holds them to the post P.

To combine the parts, I proceed as follows: The ends of the spring S have holes for the screws T and are placed in their respective boxes B and B. Then the arms G' of the guard G are placed in position and the screws T inserted. Now the spring-plate screw-holders H are forced into place, and being held in place by the screw-heads will in turn serve to effectually prevent the screws T from becoming loose.

I claim—

An attaching device for eyeglasses comprising a post having means for attachment to the lens, and an attached box having overhanging lips; a nose-spring and guard-arm connected to said post by a screw; said screw and a spring-plate curved and having a recess constructed to receive the head of the said screw and to engage with the said overhanging lips of the said box; substantially as and for the purpose set forth.

In testimony whereof I have signed my name to this specification, in the presence of two subscribing witnesses, on this 24th day of November, A. D. 1904.

HARRY FENNELL.

Witnesses:
   FRANK G. PARKER,
   JOHN BUCKLER.